July 13, 1926.
R. V. FORD
MAGNETO CONTACT PLUG MOUNTING AND LUBRICATION SYSTEM FOR INTERNAL COMBUSTION ENGINES
Filed Sept. 12, 1922
1,592,658
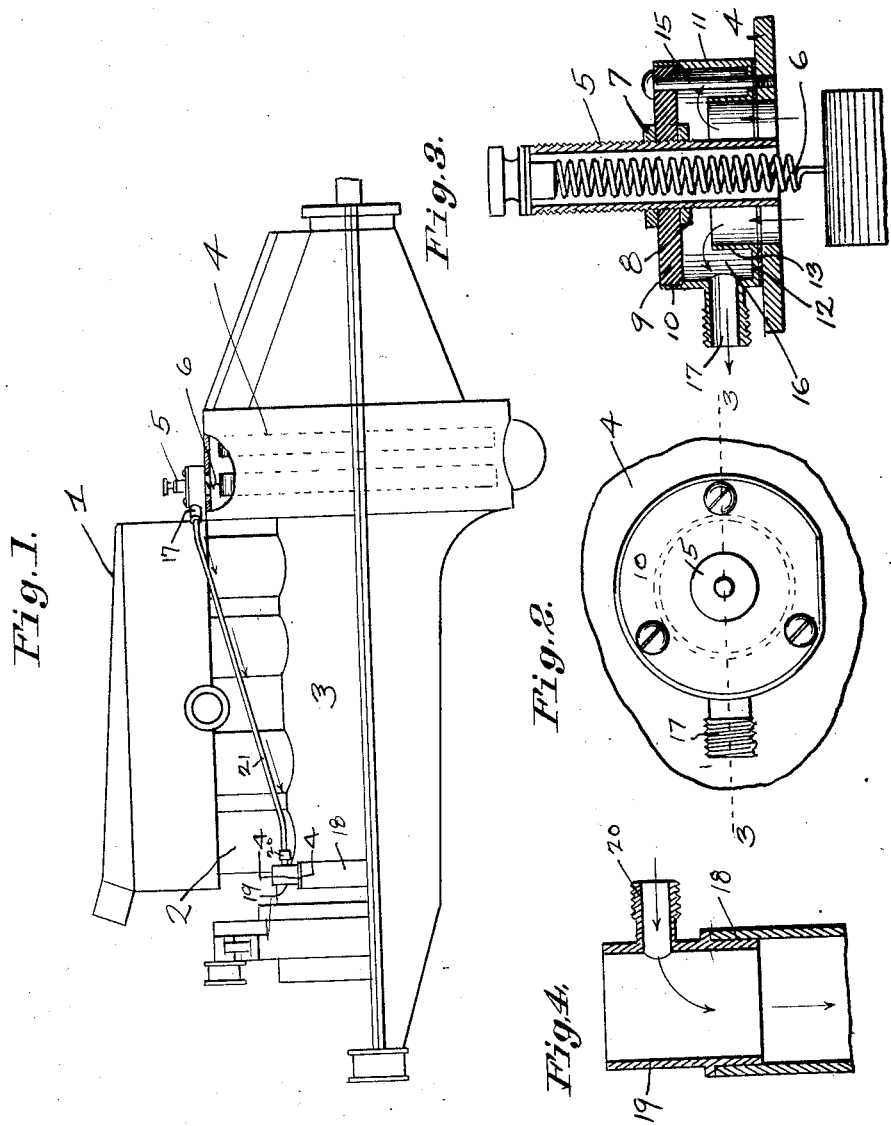
Inventor
ROBERT V. FORD
By Lincoln Johnson
Attorney.

Patented July 13, 1926.

1,592,658

UNITED STATES PATENT OFFICE.

ROBERT V. FORD, OF SAN FRANCISCO, CALIFORNIA.

MAGNETO-CONTACT-PLUG MOUNTING AND LUBRICATION SYSTEM FOR INTERNAL-COMBUSTION ENGINES.

Application filed September 12, 1922. Serial No. 587,711.

This invention relates particularly to a lubrication system for internal combustion engines.

An object of this invention is to provide a magneto contact plug mounting adapted to project through the transmission casing of an internal combustion engine, particularly of the type used in the "Ford" car, and provided with a reservoir or trap for collecting lubricant splashed about within said transmission and conveying the collected fluid to relatively unlubricated portions of said engine.

A further object of the invention relates particularly to a magneto contact plug mounting arranged with a fluid trap therein. A still further object of the invention is to provide a lubricant trap and system that will be superior in point of simplicity, inexpensiveness of construction, positiveness of operation and facility and convenience in use and general efficiency. Other objects and advantages will appear as this description progresses.

In this specification and the annexed drawings, the invention is illustrated in the form considered to be the best, but it is to be understood that the invention is not limited to such form, because it may be embodied in other forms, and it is also to be understood that in and by the claims following the description, it is desired to cover the invention in whatsoever form it may be embodied.

In the accompanying one sheet of drawings,

Fig. 1 is a side elevation of an engine having my invention applied thereto.

Fig. 2 is an enlarged plan view of my magneto contact plug mounting.

Fig. 3 is a vertical section taken through Fig. 2 on the line 3—3.

Fig. 4 is an enlarged section taken through Fig. 1 on the line 4—4.

In detail the construction illustrated in the drawings comprises an internal combustion engine 1, of the Ford type, consisting of the cylinder block 2, crank case 3 and transmission casing 4 in which are rotatably mounted the fly wheel, clutch, and driving gears, as arranged in a conventional manner. The fly wheel not shown of the Ford engine is provided with a series of horseshoe magnets arranged radially therearound and operable relative to fixed magneto coils.

The magneto contact plug 5 is arranged in and projects through the transmission casing 4 relative to the stationary magneto coils, a spring contactor element 6 being positioned in the plug 5 to maintain a constant contact between the plug 5 and magneto coils. The plug 5 is supported by suitable ring gaskets 7 and 8 in a plate or disc of non-conducting material 9. The disc 9 is demountably supported in the interior of a reduced or shouldered end 10 of an open-ended cylindrical mounting or housing 11. The housing 11 is formed from a casting or stamping of sheet metal or other equivalent material capable of being cheaply and efficiently manufactured. The opposite end of the housing 11 is either shouldered at 12 and flanged as at 13 or the integral flange 13 is omitted and in its place a washer substituted having a flange thereon. The disc 9 and shouldered end 12 of the housing are drilled with a plurality of registering holes through which are adapted to pass the screws 15 for fixedly attaching the housing 11 on to the transmission casing 4.

The invention relates to the constructing of a magneto contact plug mounting which may be securely installed in a transmission casing of a Ford motor in lieu of the regular type of plug mounting merely by substituting longer attaching screws in replacement of those removed.

The flanged and shouldered end of the mounting 11 around the plug 5 forms an internal trap or reservoir 16. Thus the contactor element 6, of the plug 5 that projects into the casing 4 receives the lubricant thrown and splashed from the rotating fly wheel, the force of which is sufficient to pass the lubricant upwardly into the trap 16 where it is collected. The mounting 11 is provided with an outlet or discharge port 17 communicating with the trap 16 through which lubricant collected in said trap may be directed to different parts of the engine, particularly by gravity flow to the forward end of the engine for lubricating the front crank shaft bearing.

It should be noticed that in attaching my apparatus to an engine it is unnecessary to drill or cut through any parts of the engine or transmission casing, the magneto plug mounting being substituted in place of the conventional plug mounting. In order that the collected lubricant will be directed back into the engine without drilling or tapping the crank case, it is necessary to remove the cap from the breather pipe 18, leading into the crank case 3, to place a length of tubing 19 therein and to connect the passage 20 of said tubing by the conduit 21 with the port 17 of the housing 11. Communication between the trap 16 and crankcase 3 may be thus established in a manner not requiring any tools and by a person not the least bit mechanically inclined. After placing the tubing 19 in the breathing pipe lubricant could be passed therethrough into the crank case with no obstructions and similarly said tubing would receive the cover cap.

Having thus described this invention, what I claim and desire to secure by Letters Patent is:—

1. In combination with an internal combustion engine and a transmission case, of a fly wheel arranged within said case; a magneto contact plug housing fixed in registering communication with the transmission case; a magneto contact plug in said housing adapted to project through the transmission case and having a part thereon to contact with said fly wheel and to receive lubricant splash therefrom; a baffle member in said housing around the magneto contact plug forming a fluid trap; and a conduit leading from the fluid trap in said housing to the said engine.

2. In a trap of the character described, the combination of a crank case, a reservoir provided with an inlet opening communicating with the interior of the said case at a point directly above the main oil reservoir, an annular wall surrounding said inlet opening to prevent drainage of the trapped liquid therethrough and a conduit extending from the reservoir to the lower front portion of the crank case.

In testimony whereof, I have hereunto set my hand at San Francisco, California, this 6th day of September 1922.

ROBERT V. FORD.